H. W. SANFORD.
SPRING LINK.
APPLICATION FILED APR. 22, 1909.
961,022.
Patented June 7, 1910.
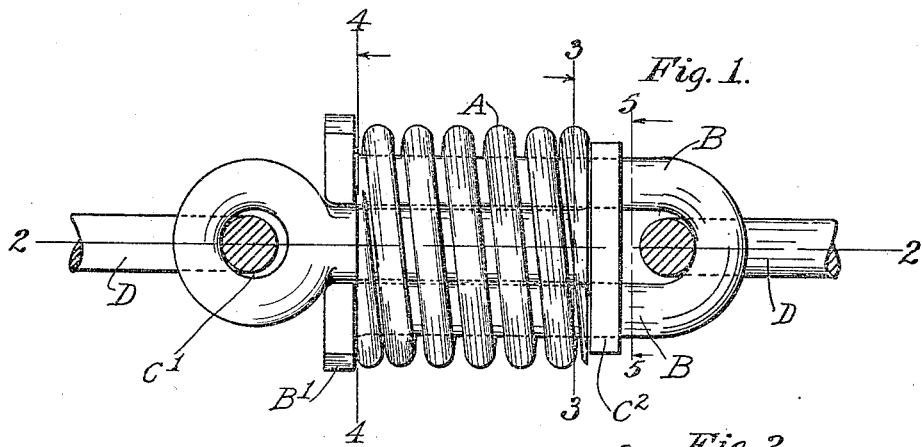
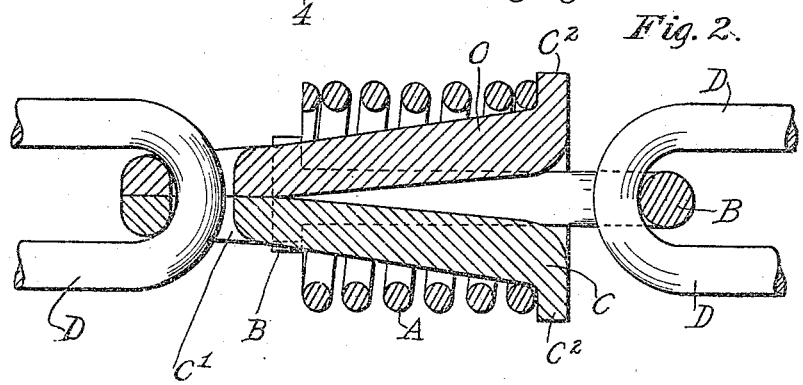
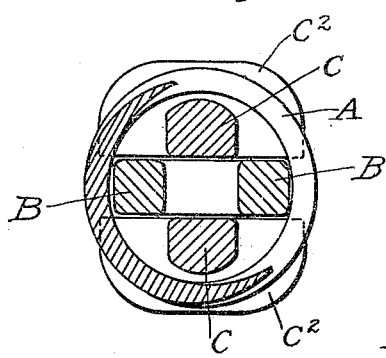
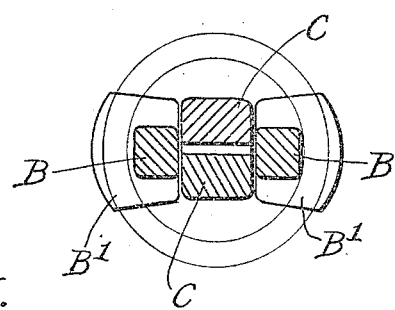
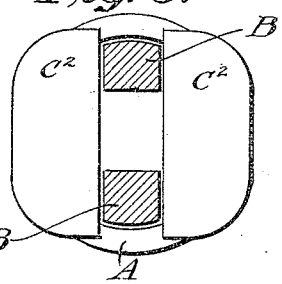
Witnesses
Carrie R. Ivy.
Wm Whaley.
Inventor,
Hugh W. Sanford
By Cyrus Kehr
Attorney

UNITED STATES PATENT OFFICE.

HUGH W. SANFORD, OF KNOXVILLE, TENNESSEE.

SPRING-LINK.

961,022.            Specification of Letters Patent.      Patented June 7, 1910.

Application filed April 22, 1909. Serial No. 491,448.

*To all whom it may concern:*

Be it known that I, HUGH W. SANFORD, a citizen of the United States, residing at Knoxville, in the county of Knox and State of Tennessee, have invented a new and useful Improvement in Spring-Links, of which the following is a specification, reference being had to the accompanying drawing.

My improvement relates particularly to links adapted to be used as a portion of a mine car coupling; but the improvement is adapted to various other uses.

The object of the invention is to produce a link which will yield to an effective extent to abnormal strains and which may be easily and cheaply made and which is composed of parts which may be made separately and afterward assembled and which are separable and interchangeable, in order that a broken part may be easily replaced by a new part.

In the accompanying drawings, Figure 1 is a side elevation of my improved link; Fig. 2 is a section on the line 2—2 of Fig. 1; Fig. 3 is a transverse section on the line 3—3 of Fig. 1, looking toward the right; Fig. 4 is a transverse section on the line 4—4 of Fig. 1, looking toward the left. Fig. 5 is a section on the line 5—5 of Fig. 1, looking toward the left.

My improved link consists of four members, namely, a spring, A, a U-shaped member, B, and two T-shaped members, C, C. The spring is a tube-form, spiral, coiled spring, having the coils of substantially uniform diameter and separated from each other so as to adapt the spring for endwise compression under strains large enough to overcome the strength of the spring. The U-shaped member, B, is located within the spring and is nearly as wide as the interior diameter of the spring, and said member is longer than said spring, as shown in Figs. 1 and 2. On the ends of the arms of said member are lateral extensions or heads, $B^1$, which extend across and abut against the adjacent end of the spring and prevent said ends of said member from going through the spring. Hence said member can be inserted into said spring only by entering the closed or folded end of said member into the spring. The two T-shaped members, C, are duplicates and the body of each lies within the spring and partially between the arms of the U-shaped member, B, said bodies meeting each other between the heads, $B^1$, of said member, B. Said members, C, extend outward beyond the heads, $B^1$, and are there provided with means, as transverse eyes, $C^1$, which are opposite and axially in line to receive a single link, clevis, or similar draft-transmitting member, D. At their opposite ends, each of said members, C, has a laterally-directed transverse head, $C^2$, which extends across and abuts against the adjacent end of the spring, A. A link, clevis, or similar draft-transmitting member, D, extends through the U-shaped member, B, outside of the heads, $C^2$.

As will now be readily understood, longitudinal strain placed upon the draft-transmitting members, D, away from the members, B and C, will draw the heads, $B^1$ and $C^2$, against the adjacent ends of the spring and, when said strain is sufficient, gradually compress said spring. In other words, relatively abrupt strain applied to one of the draft-transmitting members, D, will be gradually transmitted through my improved link to the other transmitting member, D.

The relative dimensions of the parts are such as to permit the insertion of the members, C, C, into the spring after the member, B, has been inserted, the eyes, $C^1$, of the members, C, being small enough to pass between the U-shaped member and the spring. When the parts have been thus assembled, the link or clevis members, D, are inserted, and they serve to prevent the withdrawal of the members, B and C, through the spring. If at any time it becomes desirable to replace any part of my improved link, the parts may be separated after removing the link or clevis members, D.

It will be observed that my improved link is symmetrical, and that the strains are fully parallel to and equal at opposite sides of the axis of the link.

It will also be observed that the free ends of the arms of the U-shaped member, B, are separated from each other by the two members, C, so that external pressure can not force said arms toward each other to release the heads, $B^1$, from the end of the spring. And at the same time the U-shaped member, B, lies between the heads of the members, C, and prevents the latter from approaching each other so as to cause disengagement from the end of the spring.

I claim as my invention:

1. A link comprising a tubular coiled spring adapted for endwise compression, a U-shaped member having a body small enough to pass through said spring and having laterally extended heads on its arms, and two T-shaped members having bodies extending between the arms of the U-shaped member and having laterally directed heads at one end and having their opposite ends small enough to pass through said spring and formed for engaging a draft-transmitting member, substantially as described.

2. A link comprising a tubular coiled spring adapted for endwise compression, a U-shaped member having a body small enough to pass through said spring and having laterally extended heads on its arms, and two T-shaped members having bodies extending between the arms of the U-shaped member and having laterally directed heads at one end and having their opposite ends small enough to pass through said spring and provided with eyes, substantially as described.

In testimony whereof I have signed my name, in presence of two witnesses, this 19th day of April, in the year one thousand nine hundred and nine.

HUGH W. SANFORD.

Witnesses:
CYRUS KEHR,
NOBLE SMITHSON.